United States Patent [19]

Hüber

[11] 4,116,500
[45] Sep. 26, 1978

[54] ELONGATED MACHINE ELEMENT SPHERICAL END

[75] Inventor: Wolfgang Hüber, Schweinfurt, Fed. Rep. of Germany

[73] Assignee: SKF Kugellagerfabriken GmbH, Schweinfurt, Fed. Rep. of Germany

[21] Appl. No.: 812,632

[22] Filed: Jul. 5, 1977

[30] Foreign Application Priority Data

Jul. 29, 1976 [DE] Fed. Rep. of Germany ... 7623823[U]

[51] Int. Cl.² ............................................. F16C 17/04
[52] U.S. Cl. ................................... 308/9; 29/149.5 B; 308/159; 308/172; 308/237 A; 308/DIG. 1
[58] Field of Search ................ 308/9, 121, 122, 134.1, 308/DIG. 1, 139, 140, 149, 168, 169–172, 187, 159, 189, 207, 72, DIG. 8, 237 R, 237 A; 277/DIG. 5; 29/148.4 A, 149.5 A, 149.5 B

[56] References Cited

U.S. PATENT DOCUMENTS

| | | | |
|---|---|---|---|
| 3,207,563 | 9/1965 | Muijderman | 308/172 |
| 3,306,681 | 2/1967 | Barringer | 308/140 |
| 3,902,770 | 9/1975 | Hepp et al. | 308/9 |

FOREIGN PATENT DOCUMENTS 1,497,264  5/1969  Fed. Rep. of Germany ............ 308/72

Primary Examiner—Trygve M. Blix
Assistant Examiner—Douglas C. Butler
Attorney, Agent, or Firm—Daniel M. Rosen

[57] ABSTRACT

A machine element such as a bearing, has a shaft with a spherical end. The spherical end is formed by a metal ball, such as a ball bearing, the ball being held in a hollow metal cylindrical casing. The casing has an inner diameter substantially equal to the outer diameter of the shaft, and is rigidly fit, for example, by press fitting, over the end of the shaft.

9 Claims, 2 Drawing Figures

ELONGATED MACHINE ELEMENT SPHERICAL END

BACKGROUND OF THE INVENTION

This invention relates to elongated machine elements of the type having a spherical end on a cylindrical shaft, and the invention is particularly directed to such machine elements of the type formed by fitting a ball on the end of a shaft.

Machine elements of this type are well known, and may be employed, for example, for the foot bearings of centrifuges.

Machine elements of the above type are frequently formed by welding or soldering a ball on the flattened face of a solid shaft. When the machine element is formed by such techniques, however, accurate alignment of the ball and shaft is attainable only with great expense. In order to obtain accurate centering of the ball with respect to the shaft, a prismatic or projecting peripheral rim may be formed on the end of the shaft, in order to enable centering of the ball before affixing it to the shaft. This arrangement has the disadvantage, of course, that the end of the shaft must be specially machined or otherwise formed, with the consequent increase in cost and processing steps.

SUMMARY OF THE INVENTION

The present invention is therefore directed to the provision of a machine element of the above type, which can be readily and economically fabricated to a high degree of precision, with a minimum of preworking of the components being necessary prior to assembly.

Briefly stated, in accordance with the invention, a ball is joined to a cylindrical housing, such as a sleeve, by welding, soldering or the like. The sleeve itself is then mounted on the end of the shaft, for example, by pressing. In accordance with a particularly advantageous feature of the invention, the sleeve may constitute the bearing ring of a needle or roller bearing. In a similar manner, in accordance with the further feature of the invention, the shaft may be comprised of a needle or roller of a needle or roller bearing, respectively, and the ball may constitute a conventional ball bearing.

Since all of these elements are premade to a high degree of precision, the machine element of the present invention may be assembled in a simple manner from parts manufactured for precision rolling bearings, with the result that the end product in accordance with the invention also has the highest precision. The ball may be joined to the sleeve in a known manner, for example, by resistance welding, or another suitable welding process, or by soldering, brazing, gluing, or the like. Due to the use of a cylindrical sleeve, accurate centering of the ball is achieved without the requirement of providing a prismatic face or other configuration on the end of the shaft. In addition, it is very easy to mount the sleeve on the shaft. Further, the ball and sleeves may be initially assembled and stored, for later interconnection with shafts of suitable lengths, thereby minimizing the number of components that must be stored, while enabling the ready provision of machine elements of any desired length.

In accordance with a further aspect of the invention, it is preferred that the ball have a diameter substantially equal to the median diameter of the sleeve, that is, a diameter between the inner and outer diameter of the sleeve. If the ball and sleeve are provided with these relative dimensions, then a tool may be provided that fits over the ball to engage one end of the sleeve, in order to facilitate the pressing of the sleeve onto the shaft without causing damage to the ball. The work tool, in this case, may constitute a tubular tool.

In a further feature of the invention, the ball may be provided with spiral grooves, to enhance its use as a bearing, whereby a self-supporting lubricant film may be formed between the ball and an accompanying ball socket in use.

BRIEF DESCRIPTION OF THE DRAWINGS

In order that the invention will be more clearly understood, it will now be disclosed in greater detail with reference to the accompanying drawings, wherein.

DETAILED DESCRIPTION OF THE DRAWINGS

Figure 1:
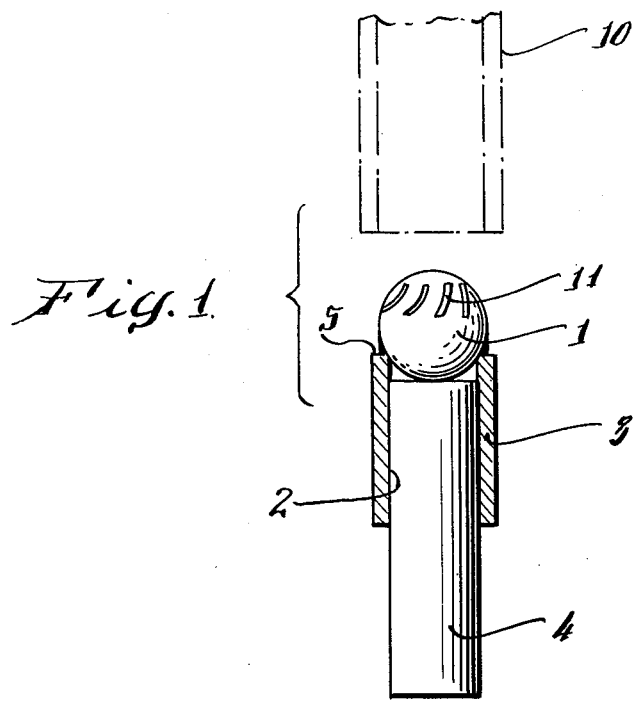
FIG. 1 is a partial cross-sectional view of a machine element in accordance with the invention, and illustrating a tool useful for mounting the machine element in dash-dot lines.

Referring now to the drawings, and more in particular to FIG. 1, therein is illustrated a machine element in accordance with the invention, comprising a ball 1. The ball 1 is preferably a ball bearing. The ball 1 is fit in the bore 2 of a cylindrical housing or shell 3, and is fastened therein by any known technique, such as welding, soldering, gluing, or the like. The ball 1 protrudes from the end of the shell 3. A shaft 4 is provided extending into the other end of the shell; and for this purpose it is preferable that the shaft 4 be press fit in the bore 2. The shell 3 is preferably comprised of a bearing ring of a needle or other type of bearing, and the shaft 4 is preferably a roller of a cylindrical roller bearing or needle from a needle bearing, bearing rings, rollers, and needles are commercially available as separate items, apart from the usual needle and roller bearing assemblies. Therefore, it is apparent that all parts of the machine element in accordance with the invention may be prefabricated components of conventional bearings.

In the preferred embodiment of the invention, the diameter of the ball 1 is substantially equal to the central diameter of the shell 3, in other words, the ball has a diameter approximately equal to the average of the inner and outer diameters of the shell 3. By employing this relationship of the diameters, it is relatively simple to press fit the shell and ball combination on the shaft 4 without damaging the ball 1. Thus, as illustrated in FIG. 1, an assembly tool may be comprised of a tubular member 10, illustrated in dash-dot lines, having an inner diameter only slightly greater than the diameter of the ball. The end of the tool 10 may then be fit over the ball, to engage the end face 5 of the shell 3 in which the ball is fit. The tool 10 may then be employed to force the shell onto the end of the shaft 4, without damaging the ball 1. This arrangement is particularly advantageous if the ball 1 is provided with spiral grooves 11, as shown in FIG. 1, for the build-up of a hydrodynamic lubricating film in use. Thus, the grooves 11 may be preformed in the ball, without fear of damage thereto in the process of assembly of the shell on the shaft.

It is, of course, apparent that the process employed for joining the ball to the shell is dependent upon the use to which the machine element of the invention will be put, taking into consideration, for example, such factors as the required strength and operating conditions of the machine element in use.

The shaft 4, as illustrated in FIG. 1, constitutes a solid component. It will be apparent, of course, that the invention is not limited to this form of a shaft, and that a cross-section of this shaft may have different shapes or forms than the solid cylindrical form illustrated. Further, it is not necessary that the shaft, particularly in the regions spaced from the shell, have a uniform diameter. The choice of the shaft thereby also depends upon the use to which the machine element will be put.

Figure 2:
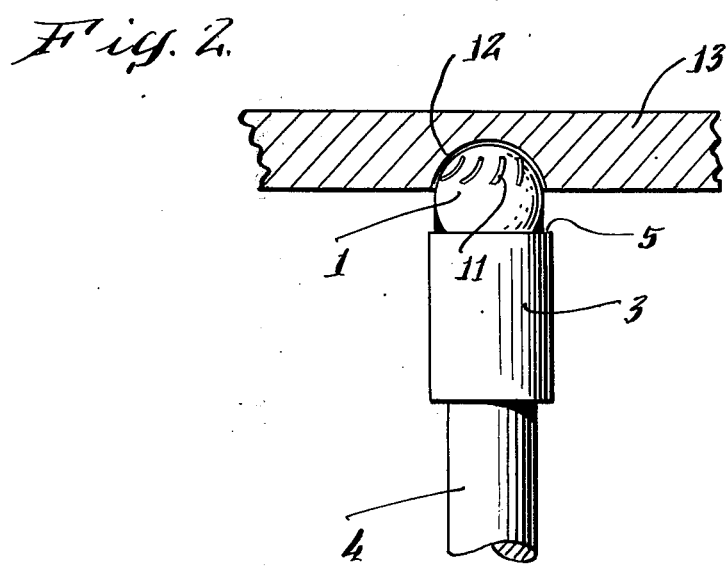
FIG. 2 is a partial cross-sectional view of a bearing structure employing the machine element of the invention.

As discussed above, the machine element of the invention can advantageously be employed as the foot bearing for a centrifuge. Similarly, the machine element may be employed in other applications, such as, for example, for the foot bearing for an electrical meter, or a spindle. In this use, the ball 1 may extend into a corresponding spherical or prismatic cup 12 of an element 13 to be suspended, as illustrated in FIG. 2. When the machine element is employed as a bearing in this manner, it can advantageously be provided with the spiral grooves as illustrated in FIG. 1, so that, upon relative rotation of the bearing parts, the pressure builds up in the groove to provide a dynamic supporting film.

It is, of course, apparent that the machine element in accordance with the invention has other uses, such as a piston for axial piston machines, or as a valve tappet or the like.

While the invention has been described with reference to a single embodiment, it will be apparent that variations and modifications may be made therein, and it is intended in the following claims to cover each such variation and modification as falls within the true spirit and scope of the invention.

What is claimed is:

1. In a machine element having a shaft with a spherical end; the improvement wherein said end comprises a spherical metal ball, said machine element further comprising a hollow metal cylindrical shell, said ball being rigidly held in and projecting from one end of said shell, the other end of said shell being rigidly coaxially fit onto the end of said shaft.

2. The machine element of claim 1, wherein said ball has a diameter at least equal to the inner diameter of said shell, said shell being press fit onto said shaft.

3. The machine element of claim 1, wherein said ball has a diameter substantially equal to the average of the inner and outer diameters of said shell.

4. The machine element of claim 1, wherein said ball comprises a ball bearing.

5. The machine element of claim 1, wherein said shell comprises a bearing ring of a needle or cylindrical roller bearing.

6. The machine element of claim 1, wherein said shaft comprises a needle or roller of a needle or cylindrical roller bearing.

7. The machine element of claim 1, wherein said ball has spiral grooves.

8. The machine element of claim 1, wherein said ball has a diameter at least equal to the inner diameter of said shell, and projects from one end of said shell, said ball being welded to said shell, said shell being press fit onto said shaft, said ball, shell and shaft comprising prefabricated bearing elements, whereby said machine element has highly precise dimensions.

9. A bearing structure comprising a ball, a shell, said ball having a diameter at least equal to the inner diameter of said shell, said ball projecting from one end of said shell and being rigidly held therein, a shaft, the other end of said shell being press fit to said shaft and held rigidly thereon, said shaft extending only partways through said shell, and a bearing cup fit over said ball and engaging the spherical surfaces thereof, whereby said bearing cup and ball are relatively movable.

* * * * *

UNITED STATES PATENT AND TRADEMARK OFFICE
CERTIFICATE OF CORRECTION

PATENT NO. : 4,116,500
DATED : September 26, 1978
INVENTOR(S) : Wolfgang Huber

It is certified that error appears in the above-identified patent and that said Letters Patent are hereby corrected as shown below:

Column 2, line 40; After "bearing," first occurrence, insert --such--.

Signed and Sealed this

Sixth Day of February 1979

[SEAL]

Attest:

RUTH C. MASON
Attesting Officer

DONALD W. BANNER
Commissioner of Patents and Trademarks